(12) United States Patent
Belpanno et al.

(10) Patent No.: US 9,539,697 B2
(45) Date of Patent: Jan. 10, 2017

(54) COLD ROOT-ROLLING DEVICE

(71) Applicants: Sandro G. Belpanno, Spencerport, NY (US); Paul W. Allart, Pittsford, NY (US)

(72) Inventors: Sandro G. Belpanno, Spencerport, NY (US); Paul W. Allart, Pittsford, NY (US)

(73) Assignee: Brinkman Products, Inc., Rochester, NY (US)

( * ) Notice: Subject to any disclaimer, the term of this patent is extended or adjusted under 35 U.S.C. 154(b) by 375 days.

(21) Appl. No.: 14/113,339

(22) PCT Filed: Dec. 14, 2012

(86) PCT No.: PCT/US2012/069752
§ 371 (c)(1),
(2) Date: Oct. 22, 2013

(87) PCT Pub. No.: WO2014/092724
PCT Pub. Date: Jun. 19, 2014

(65) Prior Publication Data
US 2014/0165352 A1   Jun. 19, 2014

(51) Int. Cl.
*B24B 39/00*   (2006.01)
*B21H 3/04*   (2006.01)
(Continued)

(52) U.S. Cl.
CPC ............... *B24B 39/00* (2013.01); *B21H 3/042* (2013.01); *B23G 7/02* (2013.01); *B23P 9/02* (2013.01); *Y10T 29/47* (2015.01)

(58) Field of Classification Search
CPC ............... B23G 7/00; B23G 7/02; B21H 3/04; B21H 3/042; B24B 39/00; B24B 39/02; B24B 39/04; B23P 9/02; Y10T 29/47
See application file for complete search history.

(56) References Cited

U.S. PATENT DOCUMENTS 3,530,743 A * 9/1970 Jacobson ................. B23Q 5/26
   408/111
3,837,241 A * 9/1974 Weiss ..................... B23D 65/02
   72/403

(Continued)

*Primary Examiner* — Edward Tolan
(74) *Attorney, Agent, or Firm* — Phillips Lytle LLP

(57) ABSTRACT

A device (20) for root-rolling a thread (T) on an object (O) includes: a body (21), an accumulator piston (24) mounted for sealed sliding movement within a body passageway (22), a coarse adjustment screw (25) threaded onto the body, a Belleville spring stack (26) compressed between the coarse adjustment screw and the accumulator piston, an actuator piston (28A or 28B) mounted for sealed sliding movement within a cylindrical opening (23) in the body, and a thread roll (32) rotatably mounted on the actuator piston. A fine adjustment screw is threaded (33) into a first opening (34) on the body, and communicates with a fluid chamber between the accumulator and actuator pistons. The positions of the coarse and fine adjustment screws may be selectively adjusted to controllably vary the fluid pressure within the chamber. The device may be mounted on a machine tool (35) and selectively moved toward the object to root-roll a thread on the object when the object and device are rotated relative to one another.

15 Claims, 4 Drawing Sheets

(51) Int. Cl.
*B23G 7/02* (2006.01)
*B23P 9/02* (2006.01)

(56) References Cited

U.S. PATENT DOCUMENTS

| | | | | |
|---|---|---|---|---|
| 4,255,956 A * | 3/1981 | Zacharias | ............... | B21B 1/026 72/225 |
| 4,331,019 A * | 5/1982 | Smith | .................. | B21D 39/046 29/237 |
| 4,571,131 A * | 2/1986 | Date | ..................... | B23B 31/305 279/4.03 |
| 4,706,483 A * | 11/1987 | Perraudin | ................ | B21H 3/02 72/102 |
| 4,766,750 A * | 8/1988 | Brinkman | .............. | B21H 3/048 72/104 |
| 5,528,917 A * | 6/1996 | Bajraszewski | ......... | B21H 5/022 72/10.6 |
| 2005/0115293 A1 * | 6/2005 | Goh | ......................... | B23P 9/02 72/84 |

* cited by examiner

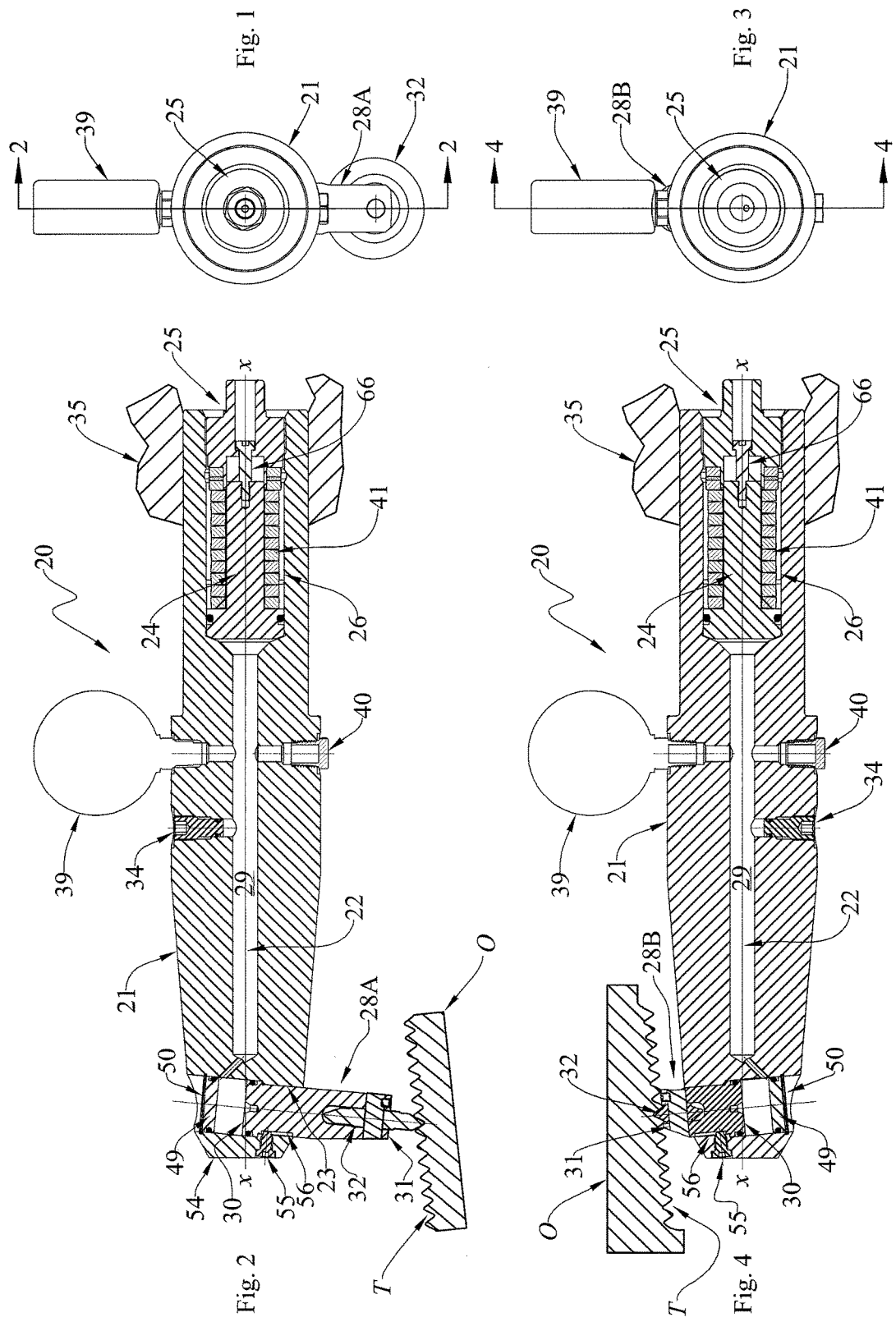

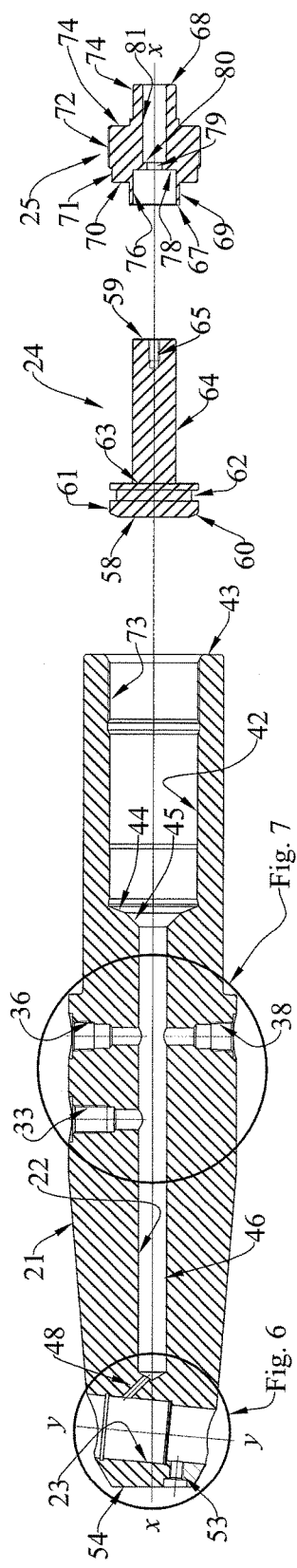
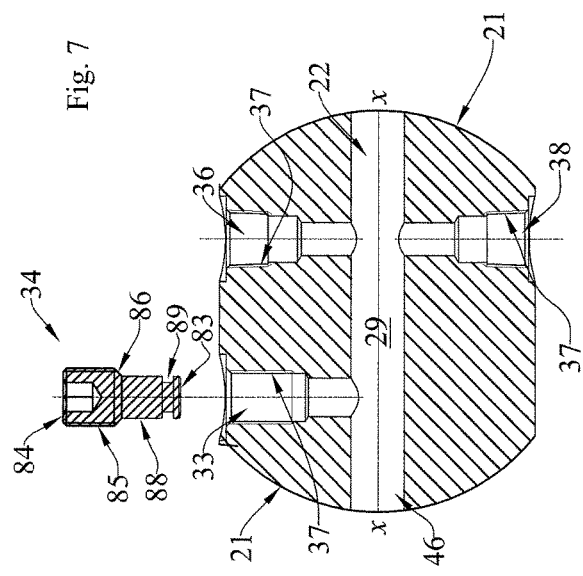
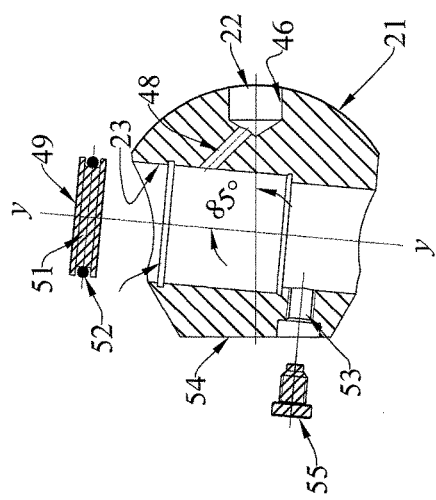
Fig. 5
Fig. 7
Fig. 6

COLD ROOT-ROLLING DEVICE

TECHNICAL FIELD

The present invention relates generally to devices for burnishing the root radius in a thread (e.g., in pipe used in the petroleum industry), and, more particularly, to an improved cold root-rolling device.

BACKGROUND ART

In the petroleum industry, lengths of pipe are threaded together to form a drill-string (i.e., a length of series-connected pipes). However, with the increasing popularity of extended-reach drilling, multi-lateral wells, and horizontal well applications, the stress and bending moments that are placed on the treaded connections in a drill-string, are increased. The increased number of pipe connections and increased stresses contribute to an increased chance of a downhole failure of the drill-string. The cost of repairing a single downhole failure may exceed one million dollars.

Cold root-rolling is the process of burnishing the root radius of a freshly-cut or previously-cut thread in a rotary shouldered connection. A hardened roll, similar in profile to the thread being burnished, is forced into contact with the root radius of the thread. Pressure is applied to cause the hardened roll to penetrate into the cut surface of the root radius. This deforms and cold-works the material, imparts an improved surface finish to the thread, and compacts and displaces the grains of the root material.

Industry experience has suggested that cold root-rolling may increase the fatigue life of a threaded connection from three to five times over a similar untreated connection under the same working conditions. Some studies have noted laboratory results suggesting that an improvement in fatigue life of up to twenty-seven times may result from the cold root-rolling process. See, e.g., Knight, M. J., Brennan, F. P. and Dover, W. D., "Fatigue Life Improvement of Threaded Connections by Cold Rolling", *Journal of Strain Analysis*, vol. 40, pp. 83-93 (Sep. 30, 2004). These various studies have attributed the increase in fatigue life to one or more of the following factors:

(1) Cold root-rolling creates a thin zone of residual compressive stress in the root region of the thread. This residual compressive stress offsets the tensile stresses produced in service, and lowers the overall stress in the critical stress region of the thread root.

(2) The burnishing effect of the smooth and hardened roll causes small scratches and ridges left by the thread-cutting operation to flatten into a more-uniform surface. These scratches may have small tip radii, and are believed to be the source of considerable stress concentrations. As a result, these scratches appear to be the crack propagation points for fatigue failures.

(3) Scratches provide prime locations for chemical erosion. The microscopic surface of a scratch is very jagged and porous. This exposes a large surface area, and numerous molecular bonding sites to the corrosive effects of liquids and gasses in a drill-string environment. Burnishing smoothes this surface, and reduces out-croppings and inclusions. It tends to reduce the area of the surface, and densely compresses the same.

(4) Cold root-rolling has a work-hardening effect of the surface of the material. On an atomic scale, compressive displacement of the crystalline lattice within the steel grain structure is believed to cause the crystal structure to change from a repetitive and uniform atomic structure to one with many dislocations in the pattern. These dislocations are believed to cause the crystal structure to interlock, and to become more resistant to further deformation. This increased resistance to further deformation helps to prevent cracks from starting, and helps to arrest microscopic cracks from growing into structural flaws that might threaten the integrity of the joint. In laboratory studies, cracks that have occurred in cold-rolled joints have exhibited a significantly-lower crack aspect ratio (i.e., the ratio of crack length to crack depth). A 30%-50% reduction in this ratio means that cracks that have occurred in cold-rolled joints are more likely to be deep and short, rather than long and shallow. A long and shallow crack is more likely to lead to a sudden and complete structural failure of the joint. A deep crack that partially penetrates the section wall is detectable via the pressure drop of circulating drilling fluids, and allows for an early recovery of a damaged drill-string prior to a complete structural failure of the joint.

Because of the foregoing advantages, cold root-rolling is now commonly performed on many freshly-cut and re-cut threads used on drill-string pipes used in the petroleum industry. It is a money-saving process. It can dramatically increase the fatigue life of each rotary-shouldered connection in a typical drill-string. It can also reduce the frequency of repairing connections in the field, and of having to fish for downhole failures.

One line of cold root-rolling products is available from Cutting Tools, Inc., 5050 Ashley Court, Houston, Tex. 77041.

Accordingly, it would be generally desirable to provide an improved device for cold root-rolling freshly-cut or re-cut threads on an object.

DISCLOSURE OF THE INVENTION

With parenthetical reference to the corresponding parts, portions or surfaces of the disclosed embodiment, merely for purposes of illustration and not by way of limitation, the present invention provides an improved device (20) for root-rolling, and, more particularly, for cold root-rolling, a thread (T) on an object (O), such as a pipe.

In one form, the improved device broadly includes a body (21) having a passageway (22), and having a cylindrical opening (23) communicating with the passageway; an accumulator piston (24) mounted on the body for sealed sliding movement within the passageway; a coarse adjustment screw (25) threadedly mounted on the body; a resilient member (26) acting between the coarse adjustment screw and the accumulator piston; an actuator piston (28A, 28B) mounted on the body for sealed sliding movement within the cylindrical opening, a chamber (29) being defined within the passageway between the accumulator piston and the actuator piston, the actuator piston having a proximal end (30) facing into the chamber and having a distal end (31); a thread roll (32) rotatably mounted on the actuator piston adjacent the distal end; the body having a first opening (33) communicating with the chamber; a fine adjustment screw (34) threadedly mounted on the body in the first opening; wherein the chamber (29) is completely filled with liquid; and wherein the positions of at least one of the coarse and fine adjustment screws (25, 34) relative to the body may be selectively adjusted to controllably vary the volume of, and the fluid pressure within, the chamber. The device may be mounted on a machine tool (35) and selectively moved toward the object to root-roll a thread on the object when the object (O) and device (20) are rotated relative to one another.

The body may have an abutment surface (44) surrounding a portion of the passageway (22) to limit movement of the accumulator piston (24) in a direction away from the coarse adjustment screw (25).

The position of the coarse adjustment screw (25) relative to the abutment surface (44) may be selectively adjusted to vary the force exerted by the resilient member (26) on the accumulator piston (24).

The position of the coarse adjustment screw (25) relative to the abutment surface (44) may be adjusted such that the resilient member (26) exerts a substantially-constant force on the accumulator piston (24) as a function of displacement of the resilient member.

The resilient member may include a Belleville spring (41), or a Belleville spring stack.

The body may have a second opening (36) communicating with the chamber (29), and the device may include a pressure gage (39) operatively arranged in the second opening to sense the pressure in the chamber. B1

The body may have a third opening (38) communicating with the chamber (29), and a closure plug (40) may be threadedly engaged with the body to close the third opening.

The improved device may be used to root-roll an internal or an external thread (T) on the object (O).

The device (20) may be mounted on a machine tool (35), without there being any external fluid connection to the device.

Accordingly, the general object of the invention is to provide an improved device for root-rolling a thread on an object, such as length of pipe.

Another object is to provide an improved device for root-rolling a thread on an object, which device may be mounted on a machine tool and moved relative to the object to root-roll a thread on the object when the object and device are rotated relative to one another, and which device does not require any external fluid connections.

These and other objects and advantages will become apparent from the foregoing an ongoing written specification, the drawings and the appended claims.

BRIEF DESCRIPTION OF THE DRAWINGS

FIG. 1 is a right end view of a first form of the improved device for cold root-rolling an external thread on an object.

FIG. 2 is a fragmentary longitudinal vertical sectional view thereof, taken generally on line 2-2 of FIG. 1, depicting the thread roll as engaging an external thread on the object.

FIG. 3 is a right end view of a second form of the improved device for cold root-rolling an internal thread on an object.

FIG. 4 is a fragmentary longitudinal vertical sectional view thereof, taken generally on line 4-4 of FIG. 3, depicting the thread roll as engaging an internal thread on the object.

FIG. 5 is a fragmentary longitudinal vertical sectional view of the body, showing the accumulator piston and the coarse adjustment screw in exploded aligned relation thereto.

FIG. 6 is an enlarged detail view of one portion of the body within the indicated circle in FIG. 5, and shows the retaining ring in exploded aligned relation to the cylindrical opening.

FIG. 7 is an enlarged detail view of another portion of the body within the indicated circle of FIG. 5, and shows the fine adjustment screw in exploded aligned relation to the body first opening.

DESCRIPTION OF THE PREFERRED EMBODIMENTS

Figure 8:
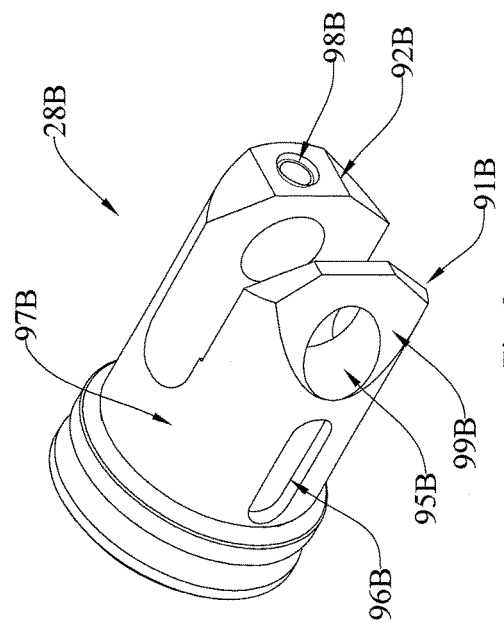
FIG. 8 is an isometric view of the short actuator piston shown in FIG. 4.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides an improved device 20 for root-rolling, and, more particularly, for cold root-rolling, a thread T on an object O. The object may, for example, be a length of pipe having internal and external threads on its opposite marginal end portions. However, while this is one example, the invention contemplates that the improved device may be used with other types of objects as well.

A first form of the improved device is shown in FIGS. 1 and 2, and a second form of the device is shown in FIGS. 3 and 4. The first form of the device is shown as operatively root-rolling an external thread on an object, whereas the second form of the device is shown as root-rolling an internal thread on an object.

The devices shown in FIGS. 2 and 4 are substantially the same, except the device shown in FIG. 2 uses a long actuator piston 28A, whereas the device shown in FIG. 4 uses a short actuator piston 28B.

Another difference is that the body of the device shown in FIG. 4, while identical to that shown in FIG. 2, is arranged as a mirror image of the body of the device shown in FIG. 2.

Still another difference is that the pressure gage, the fine adjusting screw, and the closure plug are threaded into different body openings in FIGS. 2 and 4, as discussed infra.

Otherwise, the devices shown in FIGS. 2 and 4 are the same. Because of this, the same reference numerals will be used in the following description to describe the corresponding structure in both forms of the device.

Referring now to FIGS. 2, 4 and 5, the improved device, generally indicated at 20, is shown as having a horizontally-elongated body 21 provided with an axial passageway 22, and having a cylindrical opening 23 communicating with the passageway.

An accumulator piston 24 is mounted on the body for sealed sliding movement within the right marginal end portion of the passageway. A course adjustment screw 25 is threadedly mounted in the right marginal end portion of the body. A resilient member, generally indicated at 26, acts between the course adjustment screw and the accumulator piston.

An actuator piston 28 is mounted on the body for sealed sliding movement within the cylindrical opening, with the suffixes "A" and "B" referring to the specific structure of the long and short actuator pistons, respectively. Thus, the long actuator piston is indicated at 28A in FIG. 2, and the short actuator piston is indicated at 28B in FIG. 4. A chamber 29 is defined within the passageway and the cylindrical opening between the accumulator piston and the actuator piston. The actuator piston has a proximal end 30 facing into the chamber 29, and has a distal end 31.

A smooth tool steel thread burnishing roll 32 is rotatably mounted on the actuator piston adjacent its distal end. This thread roll has a profile that is complementary to that of the thread being rolled. The body has a first opening 33 communicating with the chamber. A fine adjustment screw 34 is threadedly mounted on the body in this first opening in FIG. 2. The chamber 29 is completely filled with a suitable liquid. The positions of at least one of course and fine adjustment screws 25, 34, respectively, relative to the body may be selectively adjusted to controllably vary the volume of the chamber, and, hence, the fluid pressure therewithin.

The device may be operatively mounted on a machine tool, a fragmentary portion of which is indicated at 35 in FIGS. 2 and 4, and may be selectively moved toward the object to root-roll a thread on the object when the object and device are rotated relative to one another.

The device is further shown as further having a second opening 36 and a third opening 38 provided in the body so as to communicate with the chamber. The second and third openings are identical such that the pressure gage and the closure plug, as described infra, may be interchangeably threaded into engagement with the body in either of these openings. A pressure gauge 39 is threadedly mounted in one of the second and third openings so as to monitor the pressure within chamber 29. A closure plug 40 is mounted in the other of the second and third openings to seal the chamber. In the embodiment shown in FIG. 2, pressure gauge 39 is shown as being operatively mounted in body second opening 36, and the closure plug 40 is shown as being operatively mounted in body third opening 38. The body shown in FIG. 4 is a mirror image of that shown in FIG. 2. However, in this arrangement, the pressure gauge 39 is shown as being mounted in the third body opening 38, and the closure plug is shown as being in second body opening 40.

The resilient member 26 is shown as being a Belleville spring stack having a plurality of individual Belleville springs, severally indicated at 41. This Belleville spring stack is arranged to act between the course adjustment screw and the accumulator piston. The left end of the accumulator piston is arranged to abut an abutment surface 44 within the body to limit its leftward movement relative thereto. The course adjustment screw may be threaded into the body passageway to selectively vary the preload of the Belleville spring stack. In the preferred embodiment, the Belleville spring stack operates in the linear portion of its force-to-displacement characteristic. Optionally, the Belleville spring stack can be preloaded such that it is substantially in the horizontal range of its force-to-displacement characteristic, regardless of its displacement. This means, for all intents and purposes, that when the Belleville spring stack is so preloaded, it exerts substantially constant force on the accumulator piston. Otherwise stated, the accumulator piston may be displaced rightwardly against the urging of the Belleville spring stack, with substantially constant force, regardless of the spring stack displacement.

Referring now to FIGS. 5-7, the body is, more particularly, shown as being a specially-configured horizontally-elongated member having an axis of elongation x-x. Passageway 22 is shown as including a large-diameter cylindrical portion 42 extending leftwardly into the body from its right end face 43, having a rightwardly- and inwardly-facing frusto-conical abutment surface 44, having another rightwardly- and inwardly-facing frusto-conical surface 45, and having a small-diameter blind cylindrical portion 46 continuing leftwardly therefrom. As best shown in FIG. 6, cylindrical opening 23 is a relatively large-diameter hole drilled through the body at an acute included angle of about 85° with respect to body axis x-x. The blind passageway 22 communicates with cylindrical opening 23 via a communicating passageway 48.

A cylindrical end cap 49 is positioned within the cylindrical opening 23, and is held in this position by means of a retaining ring 50, which is snapped into an annular groove 47 extending radially into the body from surface 23. An annular groove 51 extends radially into the retaining ring to accommodate and receive an O-ring 52 that sealingly engages the wall of the cylindrical opening.

As best shown in FIG. 7, the first, second and third openings 33, 36, 38, respectively, extend into the body and communicate with chamber 29. Each of these openings is internally threaded to receive a suitable device, such as a fine adjustment screw, a pressure gauge 39, or a closure plug 40, as indicated in FIGS. 2 and 4. A threaded hole 53 extends rightwardly into the body from its left end face 54 to accommodate and receive a lock screw 55. The rightward nose of lock screw 55 is received in a keyway 56 provided on the actuator piston. This key-keyway connection between the nose of locking screw 55 and the keyway 96 on the actuator piston provides limits to motion of the actuator piston relative to the body along cylindrical opening axis y-y.

Referring now to FIG. 5, the accumulator piston 24 is shown as having an annular vertical left end face 58, an annular vertical right end face 59, and an outer surface that sequentially includes: a leftwardly- and outwardly-facing frusto-conical surface 60 that is adapted to face toward and to selectively engage body abutment surface 44, a horizontal cylindrical surface 61 provided with an annular groove 62 to accommodate an O-ring (not shown) by means of which the accumulator piston is mounted for sealed sliding movement within passageway cylindrical portion 42, a rightwardly-facing annular vertical surface 63, and a horizontal cylindrical surface 64 continuing rightwardly therefrom to join the outer margin of right end face 59. A tapped blind hole 65 extends into the accumulator piston from its right end face.

As best shown in FIGS. 2 and 4 a shoulder screw 66 may be arranged to act between the course adjustment screw 25 and the accumulator piston 24.

Adverting now to FIG. 5, the course adjustment screw 25 is a specially-configured horizontally-elongated member having an annular vertical left end face 67, an annular vertical right end face 68, and an outer surface that sequentially includes: a horizontal cylindrical surface 69 extending rightwardly from the outer margin of left end face 67, a leftwardly-facing annular vertical surface 70, a horizontal cylindrical surface 71, an externally-threaded portion 72 adapted to mate with body threads 73, a rightwardly-facing annular vertical surface 74, and an horizontal cylindrical surface 75 continuing rightwardly therefrom to join the outer margin of right end face 68. A stepped hole extends axially through the course adjustment screw. This hole is shown as being bounded by an inwardly-facing horizontal cylindrical surface 76 extending rightwardly from the inner margin of left end face 67, a leftwardly-facing annular vertical surface 78, a short cylindrical surface 79, a rightwardly-facing annular vertical surface 80, and a horizontal cylindrical surface 81 continuing rightwardly therefrom to join the inner margin of right end face 68.

As best shown in FIG. 7, the fine adjustment screw 34 is a vertical-elongated plug-like member having a lower circular surface 83, an upper horizontal circular surface 84, and an outer surface that sequentially includes: an externally-threaded portion 85 extending downwardly from the outer margin of upper end face 84 and adapted to mate with body threads 37, a downwardly- and outwardly-facing frusto-conical surface 86, and a vertical cylindrical surface 88 continuing downwardly therefrom to join the outer margin of lower end face 83. An annular groove 89 extends into the fine adjustment screw adjacent its lower end face to accommodate and receive an O-ring (not shown) by means of which the fine adjustment screw may be sealingly mounted on the body in the appropriate body opening. A polygonal hole extends downwardly into the fine adjustment surface from its upper surface 84 to receive and accommodate a suitable turning tool (e.g., an Allen wrench), by means of which the fine adjustment screw may be threaded into, or out of, engagement with the body.

In FIG. 2, the long actuator piston is indicated at 28A. In FIG. 4, the short actuator piston is indicated at 28B. These two actuator pistons are substantially the same, although piston 28A is longer than piston 28B. The long actuator piston is more fully shown in FIGS. 9-9C, and the short actuator piston is more fully shown in FIGS. 8-8C.

Figure 8C:
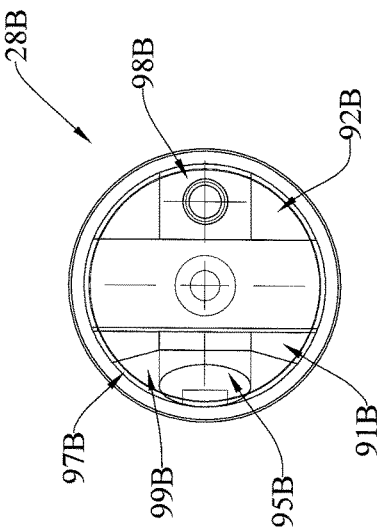
FIG. 8C is a right end elevation of the short actuator piston shown in FIG. 8.

Referring first to FIGS. 8-8C, the short actuator piston is shown as having a leftwardly-facing circular vertical left end face 90B, and two rightwardly-extending bifurcated legs 91B, 92B, respectively. The piston has an outwardly-facing horizontal cylindrical surface 93B provided with an annular groove 94B to receive and accommodate an O-ring. Aligned holes 95B, 95B extend through the bifurcated legs 91B, 92B to receive and accommodate the axle (not shown) of a roll pin. A horizontally-elongated slot 96B extends into the actuator piston from its surface 97B to receive and accommodate the nose of screw 55. A hole 98B extends into actuator leg 92B from its right end face to accommodate and receive a set screw (not shown) by means of which the roll axle may be held to the actuator pin. The actuator piston is further shown as having a planar surface 99B.

Figure 9A:
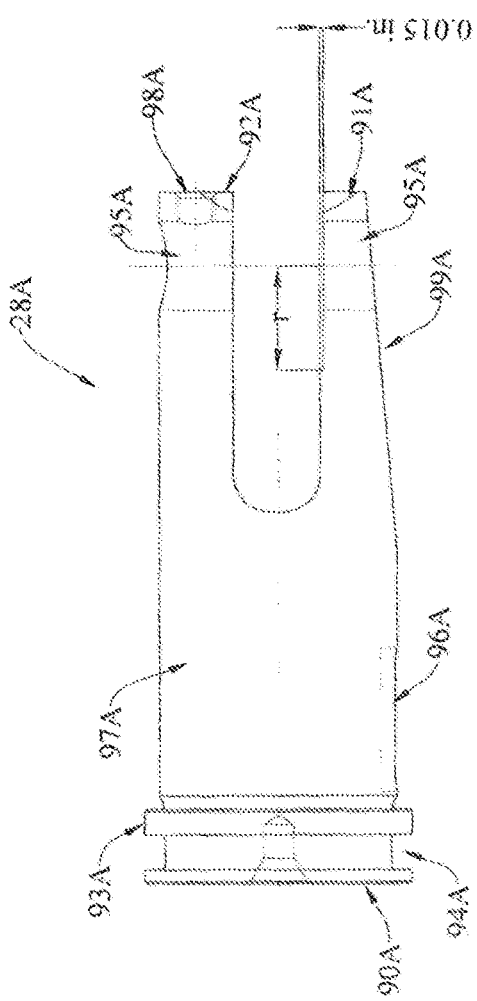
FIG. 9A is a top plan view of the long actuator piston shown in FIG. 9.
Figure 9B:
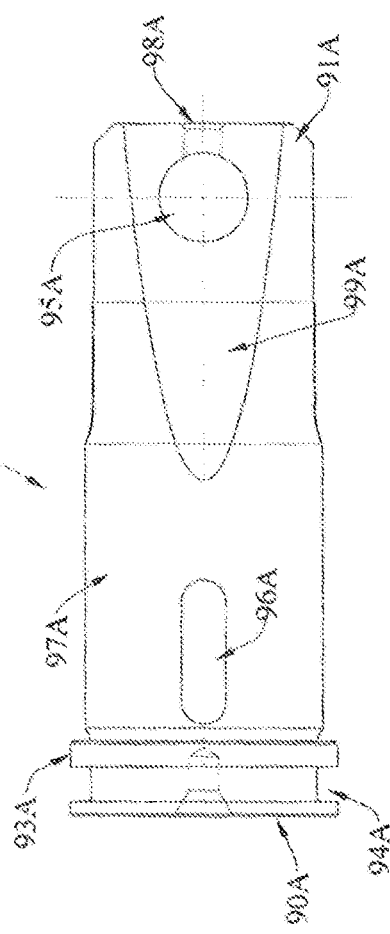
FIG. 9B is a left side elevation of the long actuator piston shown in FIG. 9.
Figure 9:
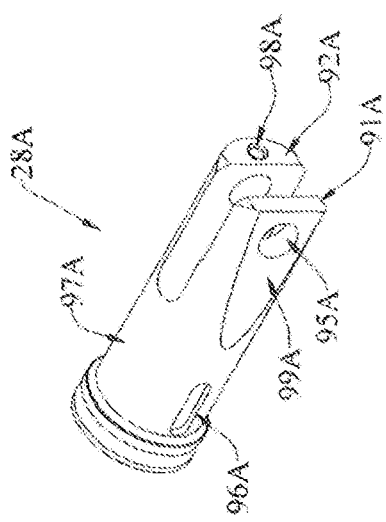
FIG. 9 is an isometric view of the long actuator piston shown in FIG. 2.
Figure 9C:
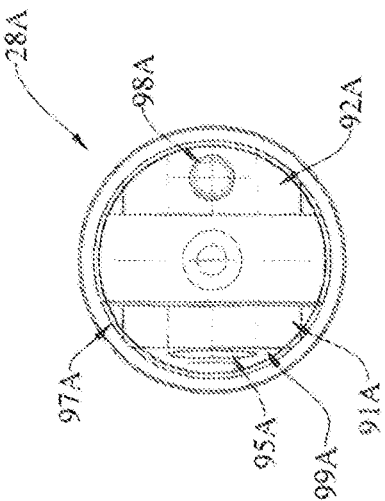
FIG. 9C is a right end elevation of the long actuator piston shown in FIG. 9.

The long actuator piston is shown in FIGS. 9-9C. This actuator piston is simply elongated relative to short piston shown in FIGS. 8-8C. Hence, the long piston has the same parts as previously described with respect to the short piston, except that these are indicated with the suffix "A", rather than "B".

Therefore, the present invention broadly provides an improved device (20) for root-rolling a thread (T) on an object (O) that includes a body (21) having a passageway (22), and having a cylindrical opening (23) communicating with the passageway; an accumulator piston (24) mounted on the body for sealed sliding movement within the passageway; a course adjustment screw (25) threadedly mounted on the body; a resilient member (26) acting between the course adjustment screw and the accumulator piston; and an actuator piston (28A or 28B) mounted on the body for sealed sliding movement within the cylindrical opening. A chamber (29) is defined within the passageway between the accumulator piston and the actuator piston. The actuator piston has a proximal end (30) facing into the chamber, and has a distal end (31). A thread roll (32) is rotatably mounted on the actuator piston adjacent its distal end. The body has a first opening (33) communicating with the chamber. A fine adjustment screw (34) is threadedly mounted on the body in the first opening. The chamber is completely filled with a suitable fluid, such as a relatively-incompressible liquid. The positions of at least one of the course and fine adjustment screws relative to the body may be selectively adjusted to controllably vary the fluid pressure within the chamber. The device may be mounted on a machine tool (35) and selectively moved toward the object to root-roll a thread on the object when the object and device are rotated relative to one another.

Upon information and belief, the present invention has a number of points of patentable distinction over the prior art. These include: (1) the use of a self-contained pressure generator and accumulator, (2) a unique roll orientation system, (3) the use of a digital pressure device, and (4) conversion-free force measurement.

As to the first point, no known item of prior art uses a self-contained pressure generation device, or a self-contained fluid accumulator. This obviates the need for an external pressure pump, an external accumulator, and various hose connections, disconnect fittings, and valves. This simplifies installation and use, and removes considerable clutter from the work zone of the machine tool.

As to the second point, no known prior art reference has a system for assuring the correct thread-burnishing roll orientation relative to the pre-cut thread form on the workpiece. The thread form on the workpiece is symmetric about a line perpendicular to the workpiece's main thread axis. Due to the 85° incline of the roll holder, the threadburnishing roll has asymmetric profile, biased 5° to one side, to complement and cancel the 5° incline of the roll holder. On all known prior art devices, great care must be taken to avoid mounting the roll in in inverted position. If the roll is not mounted in the correct orientation, the burnishing operation will cause substantive damage to the thread, requiring rework or scrapping of the workpiece. On known prior art devices, this orientation is only verifiable visually, and it is difficult to discern due to the small angle of the incline.

Figure 8A:
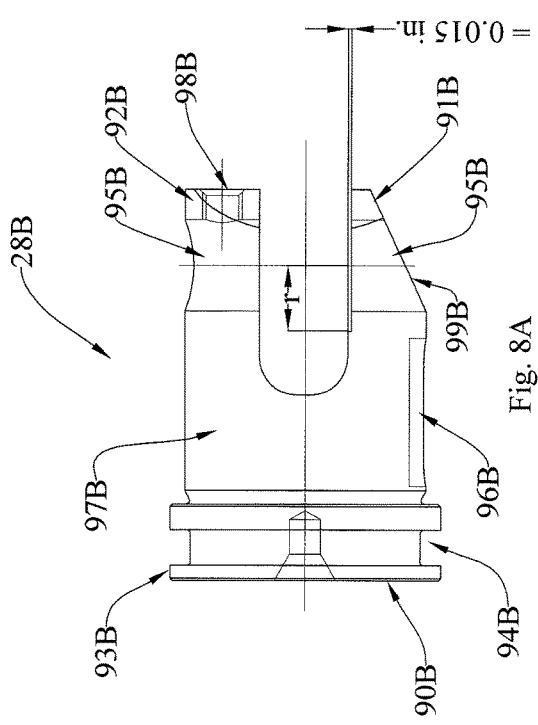
FIG. 8A is a top plan view of the short actuator piston shown in FIG. 8.
Figure 8B:
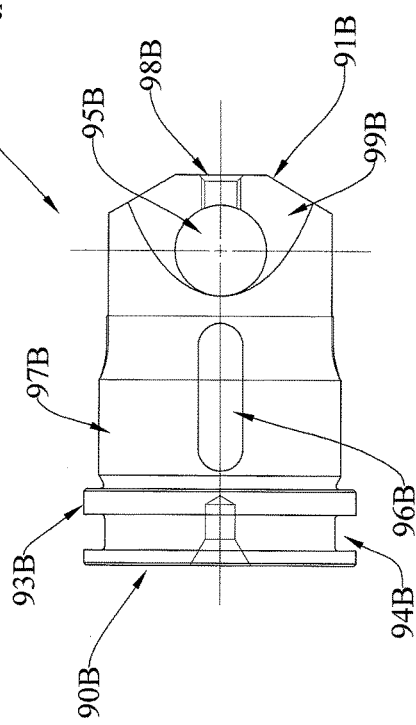
FIG. 8B is a left side elevation of the short actuator piston shown in FIG. 8.

On the other hand, Applicants' improved attachment uses an asymmetric roll holder, along with asymmetric hub geometry on the rolls themselves, to insure that the rolls will only mount on the attachment in the proper orientation. The preferred embodiment uses a slight step in the lateral wall of the roll mounting pocket of approximately 0.015 inch, located at some radial distance (r) away from the centerline of the roll mounting axis. The opposing wall has no such step. This is clearly shown in FIGS. 8A and 9A. The preferred embodiment uses a roll with two different hub diameters on its opposite faces. One hub has a radius slightly less than the radial distance (r). The other hub has a radius slightly greater than radial distance (r). When a roll with these asymmetric hubs is inserted into a receiving pocket with the step, the roll will only align properly with the roll pin axis if the smaller hub is adjacent to the step. If the roll is inserted such that the larger hub is adjacent the step, the hub will make contact with the step prior to alignment of the roll axis with the roll pin hole axis, thus preventing the roll pin form being inserted improperly.

While the preferred embodiment uses two differently-sized hubs on the opposite faces of the roll, persons skilled in this art will readily appreciate that other forms might achieve the same objective; namely, of preventing the roll from being improperly inserted into the pocket. Some alternatives might include, but are not limited to, the provision of two steps in the receiver at different radial distances, a tapered roll bore to be used in conjunction with a tapered roll axle, a stepped roll bore to be used with a stepped roll axle, a roll pocket with a minimally-enlarged profile similar to the asymmetric thread form on the roll, and the like.

As to the third point, no known item of prior art uses a digital pressure monitoring device. All known prior art devices are believed to use an analog pressure gage with a dial to indicated instantaneous pressure in the attachment. To read the gage, the user needs to be in close proximity to the gage, typically within line of sight and usually no more than about thirty-six inches away. The gage reads only the current instantaneous pressure. Hence to monitor pressure within the working cycle, as required by the standards governing pipe used in the petroleum industry, the user would have to be in close proximity to large moving parts and spraying lubricant, placing the user in harm's way. This may violate OSHA standards of safety.

Applicants' device uses a digital gage with a min/max recall function, and gives the user the ability to monitor the pressure more remotely and from a safe distance. The user can read large text value that has been digitally damped, on a back-lit display through a machine enclosure window, rather than trying to discern the placement of a small needle wildly fluxuating between fine gradients. The improved digital pressure gage is equipped with a min/max recall function. The pressure values reached during rolling are recorded and can be observed after the fact, once the machine has stopped moving and it is safe to approach the attachment. Using an optional wireless pressure transducer package, the pressure can be continuously monitored and recorded remotely, either on a display outside the machine enclosure, or in an office located elsewhere in the manufacturing facility or even via the internet at a further remote location, such as a customer's location. The pressure values can also be recorded and tracked to the serial number of the component being worked on, to provide traceability to end users and regulatory bodies.

As to the fourth point, no known item of prior art is constructed in such a way as to obviate the need to convert the numerical value of indicated pressure into pounds of burnishing force. The standards governing this cold root-rolling operation, specifically the T. H. Hill specification DS-1, require that a minimum force be applied for each of the various thread sizes. However, since the prior art devices have no means for measuring force directly, they usually measure the hydraulic pressure instead, and then use a chart to convert the pressure recorded to the calculated force. In Applicants' device, pressure is also recorded. However the working piston has been sized such that its surface area is exactly 1 in$^2$ so that the numerical values of pressure will also be the numerical value of pounds of force, with no scaling factor or conversion required. One psi of pressure will be equal to one pound of force. This simplifies the operation, and eliminates a potential source of calculation error.

Modifications

The present invention expressly contemplates that many changes and modifications may be made. For example, the materials of construction are not deemed critical. The length of any part, and its proportion and degree relative to another part, is not deemed critical. The passageway and the chamber may be formed by other techniques than that shown. The object is not limited to being a length of pipe.

The resilient member could be a Belleville spring, a Belleville spring stack, a die spring, a machined spring, a bellows, or a pneumatic device filled with a charge gas, such as nitrogen.

Therefore, while two forms of the improved root-rolling device have been shown and described, and several changes and modifications thereof discussed, persons skilled in this art will readily appreciate the various additional changes and modifications may be made without departing from the spirit of the invention, as defined and differentiated by the following claims.

What is claimed is:

1. A device for root-rolling a thread on an object with controllable force along the entire length of said thread, comprising:
    a body having a passageway, and having a cylindrical opening communicating with said passageway;
    an accumulator piston mounted on said body for sealed sliding movement within said passageway;
    a coarse adjustment screw threadedly mounted on said body;
    a resilient member acting between said coarse adjustment screw and said accumulator piston;
    an actuator piston mounted on said body for sealed sliding movement within said cylindrical opening, a chamber being defined within said passageway between said accumulator piston and said actuator piston, said actuator piston having a proximal end facing into said chamber and having a distal end;
    a thread roll rotatably mounted on said actuator piston adjacent said distal end;
    said body having a first opening communicating with said chamber;
    a fine adjustment screw threadedly mounted on said body in said first opening;
    wherein said chamber is completely filled with liquid;
    wherein the positions of at least one of said coarse and fine adjustment screws relative to said body may be selectively adjusted to controllably vary the fluid pressure within said chamber;
    wherein said thread roll has an asymmetric configuration;
    wherein said actuator piston has a pocket adapted to receive said thread roll; and
    wherein said pocket has an asymmetric configuration complementary to the asymmetric configuration of said thread roll such that said thread roll may only be inserted into said pocket when said thread roll is in said proper orientation relative to said actuator piston;
    whereby said device may be mounted on a machine tool and selectively moved toward said object to root-roll a thread on said object with controllable force along the entire length of said thread when said object and device are rotated relative to one another.

2. A device as set forth in claim 1 wherein said body has an abutment surface surrounding a portion of said passageway to limit movement of said accumulator piston in a direction away from said coarse adjustment screw.

3. A device as set forth in claim 2 wherein the position of said coarse adjustment screw relative to said abutment surface may be adjusted to vary the force exerted by said resilient member on said accumulator piston.

4. A device as set forth in claim 3 wherein the position of said coarse adjustment screw relative to said abutment surface is adjusted such that said resilient member exerts a force on said accumulator piston as a function of displacement.

5. A device as set forth in claim 4 wherein said resilient member includes a Belleville spring.

6. A device as set forth in claim 1 wherein said body has a second opening communicating with said chamber, and wherein said device includes a pressure gage operatively arranged in said second opening to sense the pressure in said chamber.

7. A device as set forth in claim 6 wherein said pressure gage is digital, and has a min/max recall feature.

8. A device as set forth in claim 7 wherein said pressure gage includes a transmitter for transmitting an indicated pressure to a remote location.

9. A device as set forth in claim 7 wherein said accumulator piston is sized so that said pressure gage will indicate pounds of force exerted.

10. A device as set forth in claim 6 wherein said body has a third opening communicating with said chamber, and further comprising a plug, and wherein said plug is threadedly engaged with said body to close said third opening.

11. A device as set forth in claim 1 wherein said device may be used to root-roll an internal thread or an external thread on said object.

12. A device as set forth in claim 1 wherein there is no external fluid connection to said device.

13. A device as set forth in claim 1 wherein said body has a second opening communicating with said chamber and has a third opening communicating with said chamber, and further comprising a plug threadedly engaged with said body to close one of said second and third openings, and further comprising a pressure gage operatively arranged in the other of said second and third openings to sense the pressure in said chamber.

14. A device as set forth in claim 1 wherein said thread roll has a hole having an axis, wherein said actuator piston has a hole having an axis, and wherein said thread roll hole is adapted to align with said actuator piston hole when said thread roll is inserted into said pocket only when said thread roll is in said proper orientation relative to said actuator piston.

15. A device as set forth in claim 1 wherein said thread roll has opposite faces, wherein a hub of one diameter extends outwardly from one of said faces, and a hub of a different diameter extends outwardly from the other of said faces, and wherein said hubs are generated about the axis of said thread roll hole.

\* \* \* \* \*